(12) United States Patent
Sun (10) Patent No.: US 11,724,729 B2
(45) Date of Patent: Aug. 15, 2023

(54) CHILD TRAILER WITH LOW FOLDING THICKNESS

(71) Applicant: CHANGZHOU EASYLIFE PRODUCTS CO., LTD., Changzhou (CN)

(72) Inventor: Yunpeng Sun, Changzhou (CN)

(73) Assignee: CHANGZHOU EASYLIFE PRODUCTS CO., LTD., Changzhou (CN)

( * ) Notice: Subject to any disclaimer, the term of this patent is extended or adjusted under 35 U.S.C. 154(b) by 146 days.

(21) Appl. No.: 17/331,667

(22) Filed: May 27, 2021

(65) Prior Publication Data
US 2022/0242473 A1    Aug. 4, 2022

(30) Foreign Application Priority Data
Jan. 29, 2021    (CN) .......................... 202120273792.5

(51) Int. Cl.
*B62B 9/12* (2006.01)
*B62B 7/02* (2006.01)
*B62K 27/00* (2006.01)

(52) U.S. Cl.
CPC .................. *B62B 9/12* (2013.01); *B62B 7/02* (2013.01); *B62K 27/003* (2013.01)

(58) Field of Classification Search
CPC .. B62B 9/12; B62B 7/02; B62B 7/046; B62B 7/126; B62B 7/105; B62K 27/003
See application file for complete search history.

(56) References Cited

U.S. PATENT DOCUMENTS

| 5,577,746 | A | * | 11/1996 | Britton | B62K 27/02 280/204 |
| 5,785,333 | A | * | 7/1998 | Hinkston | B62K 27/16 280/647 |
| 5,829,771 | A | * | 11/1998 | Hsu | B62K 27/003 280/204 |
| 5,984,332 | A | * | 11/1999 | Beaudoin | B62K 27/003 280/647 |
| 7,387,310 | B1 | * | 6/2008 | Liu | B62B 7/10 280/642 |
| 2017/0341671 | A1 | * | 11/2017 | Fleming | B62K 27/02 |
| 2022/0089247 | A1 | * | 3/2022 | Andersson | B62B 7/126 |

FOREIGN PATENT DOCUMENTS

WO    WO-2009067818 A1 *   6/2009   .............. B60D 1/00

* cited by examiner

*Primary Examiner* — Minnah L Seoh
*Assistant Examiner* — Ryan Edward Hardy
(74) *Attorney, Agent, or Firm* — Bayramoglu Law Offices LLC (57) ABSTRACT

A child trailer has a bottom frame and a side frame, and a folding joint is disposed on the tail support of the trailer. A front end of the bottom frame is rotationally connected with a front end of the side frame. A top support rod is fixed at a rear end of the side frame. Left and right ends of the top support rod are respectively connected with an upper-section tail support rod rotating around an axis thereof. A tail end of the upper-section tail support rod is connected with a folding joint. The other end of the folding joint is connected with a lower-section tail support rod. A rear end of the bottom frame is connected with a tail rack rotating around a shaft parallel to the axis of the top support rod.

9 Claims, 7 Drawing Sheets

CHILD TRAILER WITH LOW FOLDING THICKNESS

CROSS REFERENCE TO THE RELATED APPLICATIONS

This application is based upon and claims priority to Chinese Patent Application No. 202120273792.5, filed on Jan. 29, 2021, the entire contents of which are incorporated herein by reference.

TECHNICAL FIELD

The present invention relates to the technical field of child trailers, and particularly relates to a child trailer with low folding thickness.

BACKGROUND

At present, the side supports and tail supports of a child trailer with front and rear folding functions on the market generally have a curvature, and the tail supports of the folded trailer are tilted, which makes the height of the folded trailer higher, thereby resulting in higher packaging, warehousing and transportation cost, increasing the purchase cost of consumers, and being not conducive for consumers to carry in a self-driving travel.

SUMMARY

In order to solve the defects in the prior art, the present invention proposes a child trailer with low folding thickness.

In order to achieve the above objective, the present invention adopts the following technical solution:

A child trailer with low folding thickness includes a bottom frame and a side frame, wherein a front end of the bottom frame is rotationally connected with a front end of the side frame; a top support rod is fixed at a rear end of the side frame; left and right ends of the top support rod are respectively connected with an upper-section tail support rod rotating around an axis thereof; a tail end of the upper-section tail support rod is connected with a folding joint; the other end of the folding joint is connected with a lower-section tail support rod; a rear end of the bottom frame is connected with a tail rack rotating around a shaft parallel to the axis of the top support rod; and a tail end of the lower-section tail support rod is rotationally connected with a middle part of the tail rack; a folding locking member matched with the tail rack is fixed on the lower-section tail support rod or the upper-section tail support rod; and rear wheels are mounted on a rear side of the bottom frame, and a towing rod device extending forward is fixed at a bottom of a front side of the bottom frame.

Preferably, the side frame is of a U-shaped structure; the front end of the bottom frame is fixedly connected with two side frame connecting racks; and the front end of the side frame is sleeved in the side frame connecting racks and can rotate around the axis of a section thereof connected with the side frame connecting racks.

Preferably, the folding joint includes a first rotating block, a second rotating block and a rotating piece; the first rotating block is fixedly connected with an upper connecting part; the upper connecting part is fixed to the upper-section tail support rod; the second rotating block is fixedly connected with a lower connecting part; the lower connecting part is fixed to the lower-section tail support rod; the rotating piece is located on the rear sides of the first rotating block and the second rotating block; two ends of the rotating piece are respectively hinged at a middle part of the first rotating block and a middle part of the second rotating block; and rotating piece grooves matched with the rotating piece are respectively formed on the rear sides of the first rotating block and the second rotating block.

Preferably, an upper part of the tail rack is provided with a U-shaped bending part; a middle part of the bending part protrudes toward the rear side, and when the trailer is unfolded, the tail rack is attached to the upper-section tail support rods, the folding joints and the lower-section tail support rods.

Preferably, anti-collision blocks are respectively disposed on left and right sides of the bottom frame.

Preferably, a push handle is disposed at the rear end of the side frame.

Preferably, a bending section located on the front side of the rear wheel is disposed on each of left and right sides of the bottom frame; an included angle between the bending section and a front section is between 160° and 170°; an included angle between the bending section and a rear section is between 160° and 170°, and the rear section is higher than the front section; a rear seat member is fixedly disposed on a lower side of each of the bending sections, and a rear seat cross rod is fixedly disposed between the two rear seat members.

Preferably, a front wheel component is mounted at the front part of the bottom frame, and the front wheel component includes a front bicycle assembly seat, a jogging wheel, a cartwheel and a jogging wheel fastener.

Preferably, the jogging wheel is assembled on a front side of the front bicycle assembly seat and is locked by the jogging wheel fastener.

Preferably, the cartwheel is assembled on a lower side of the front bicycle assembly seat and is locked by a locking member.

The present invention has the following beneficial effects:

1. A folding joint is disposed on the tail support of the trailer, and after the trailer is folded, the upper and lower sections of the tail support can be rotated to change the included angle so as to follow the direction of the bottom frame, so that the height of the folded trailer is reduced; the warehousing space is saved; the warehousing and transportation costs are reduced; and the storage space of users can also be saved.

2. The bending sections are also disposed on the bottom frame; the rear seat members and the rear seat cross rod are mounted on the lower sides of the bending sections; and seat cloth is fixed on the rear seat cross rod, so that the seat can be lowered to increase the bottom space of the seat, and the center of gravity can also be lowered to prevent the trailer from turning over.

3. The front wheel component is mounted at the front part of the trailer, which can reduce the deviation of the trailer to the left and right during the traveling process to keep the trailer stable, and the front wheel component can be equipped with either a jogging wheel or a cartwheel, which is suitable for jogging and bicycle traction.

1 denotes a bottom frame; 2 denotes a side frame; 3 denotes a side frame connecting rack; 4 denotes a top support rod; 5 denotes an upper-section tail support rod; 6 denotes a folding joint; 61 denotes a first rotating block; 62 denotes an upper connecting part; 63 denotes a second rotating block; 64 denotes a lower connecting part; 65 denotes a rotating piece; 7 denotes a lower-section tail support rod; 8 denotes an auxiliary reinforcing member; 9 denotes a tail rack; 10 denotes a tail rack connector; 11 denotes a folding locking member; 12 denotes a rear wheel; 13 denotes an anti-collision block; 14 denotes a towing rod device; 15 denotes a rear seat member; 16 denotes a rear seat cross rod; 17 denotes a front wheel component; 171 denotes a front bicycle assembly seat; 1711 denotes a seat body; 1712 denotes an inserted rod sleeve; 1713 denotes a support plate; 1714 denotes a fastener hole; 1715 denotes a cartwheel seat; 172 denotes an assembly seat upper housing; 173 denotes a jogging wheel; 174 denotes a jogging wheel front fork; 175 denotes a jogging wheel inserted rod; 176 denotes a cartwheel; 177 denotes a cartwheel front fork; 178 denotes a jogging wheel fastener; and 18 denotes a push handle.

DETAILED DESCRIPTION OF THE EMBODIMENTS

The technical solutions in the embodiments of the present invention will be clearly and completely described below with reference to the figures in the embodiments of the present invention. It is apparent that the described embodiments are only a part of the embodiments of the present invention, rather than all of the embodiments.

Figure 1:
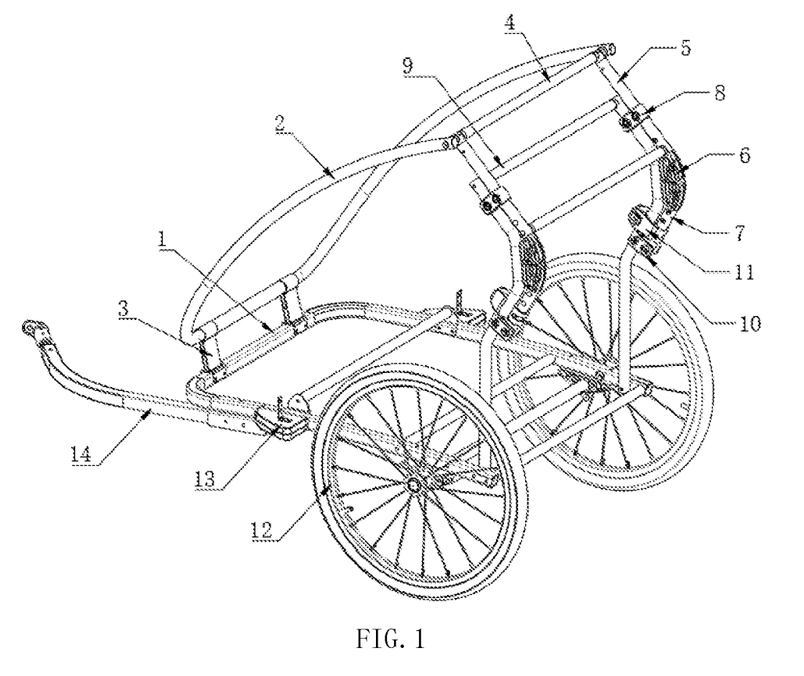
FIG. 1 is a schematic diagram of an unfolded structure of Embodiment 1 of a child trailer with low folding thickness proposed by the present invention.
Figure 2:
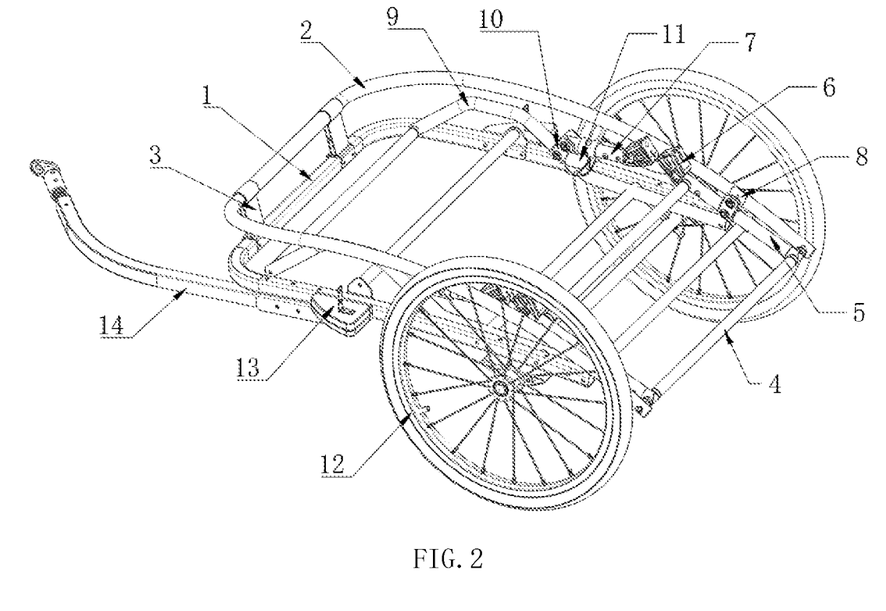
FIG. 2 is a schematic diagram of a folded structure of Embodiment 1 of a child trailer with low folding thickness proposed by the present invention.
Figure 3:
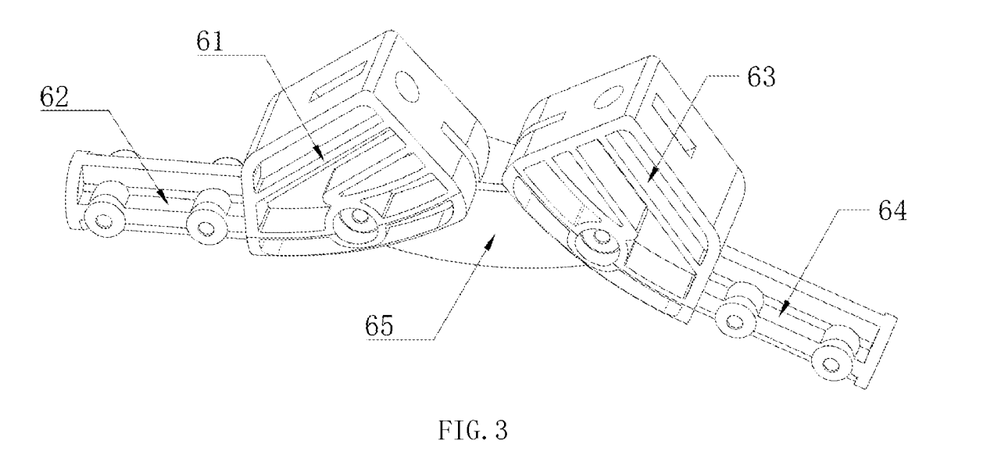
FIG. 3 is a schematic structural diagram of a folding joint of a child trailer with low folding thickness proposed by the present invention.

Embodiment 1: Referring to FIG. 1 to FIG. 3, a child trailer with low folding thickness includes a bottom frame 1 and a side frame 2.

The front end of the bottom frame 1 is rotationally connected with the front end of the side frame 2. Specifically, the side frame 2 is of a U-shaped structure. The front end of the bottom frame 1 is fixedly connected with two side frame connecting racks 3. The front end of the side frame 2 is sleeved in the side frame connecting racks 3 and can rotate around the axis of a section thereof connected with the side frame connecting racks 3. A top support rod 4 is fixed at the rear end of the side frame 2. The left and right ends of the top support rod 4 are respectively connected with an upper-section tail support rod 5 rotating around the axis thereof. The tail end of the upper-section tail support rod 5 is connected with a folding joint 6. The other end of the folding joint 6 is connected with a lower-section tail support rod 7. The rear end of the bottom frame 1 is connected with a tail rack 9 rotating around a shaft parallel to the axis of the top support rod 4. The tail end of the lower-section tail support rod 7 is rotationally connected with the middle part of the tail rack 9.

The upper end of seat cloth is fixed at the head end of the tail rack 9, and the bottom of the seat cloth is fixed to the bottom frame 1.

The folding joint 6 includes a first rotating block 61, a second rotating block 63 and a rotating piece 65. The first rotating block 61 is fixedly connected with an upper connecting part 62. The upper connecting part 62 extends into the upper-section tail support rod 5 and is fixed to the upper-section tail support rod. The second rotating block 63 is fixedly connected with a lower connecting part 64. The lower connecting part 64 extends into the lower-section tail support rod 7 and is fixed to the lower-section tail support rod. The rotating piece 65 is located on the rear sides of the first rotating block 61 and the second rotating block 63. Two ends of the rotating piece 65 are respectively hinged at the middle part of the first rotating block 61 and the middle part of the second rotating block 63. Rotating piece grooves matched with the rotating piece 65 are respectively formed on the rear sides of the first rotating block 61 and the second rotating block 63.

In order to expand the rear space and enhance the stability of the trailer, the upper part of the tail rack 9 is provided with a U-shaped bending part. The middle part of the bending part protrudes toward the rear side. An included angle is between 100° and 110°. When the trailer is unfolded, the tail rack 9 is attached to the upper-section tail support rods 5, the folding joints 6 and the lower-section tail support rods 7. Further, the upper-section tail support rod 5 is sleeved with an auxiliary reinforcing member 8 fixed to the upper-section tail support rod. After the trailer is unfolded, the auxiliary reinforcing member 8 surrounds the tail rack 9. The lower end of the lower-section tail support rod 7 is rotationally connected with a tail rack connector 10. The tail rack connector 10 surrounds the tail rack 9 and is fixed to the tail rack.

A folding locking member 11 matched with the tail rack 9 is fixed on the lower-section tail support rod 7. After the trailer is unfolded, the folding locking members 11 are buckled on the tail rack 9.

Rear wheels 12 are mounted on the rear side of the bottom frame 1.

A towing rod device 14 extending forward is fixed at the bottom of the front side of the bottom frame 1, and is configured to connect a bicycle in front.

Anti-collision blocks 13 are respectively disposed on the left and right sides of the bottom frame 1 to prevent direct collision of the trailer body.

Further, the rear end of the side frame 2 is provided with a foldable push handle 18, which can be configured to push the trailer.

When the trailer is folded, the folding locking members 11 are pulled to be separated from the tail rack 9. Under the action of gravity, the tail rack 9 rotates its head end to fall until its head end is in contact with the bottom frame 1. The side frame 2 rotates its rear end to fall, then the upper-section tail support rods 5 rotate relative to the top support rod 4 and are separated from the tail rack 9. The lower-section tail support rods 7 rotate relative to the upper-section tail support rods 5 and the tail rack 9 and are separated from the tail rack 9. The first rotating blocks 61 and the second rotating blocks 63 in the folding joints 6 rotate relative to the rotating pieces 65 and are separated from each other, so that the folded lower-section tail support rods 7 and upper-section tail support rods 5 are more closely attached to the bottom frame 1, thereby reducing the height of the folded trailer.

Figure 4:
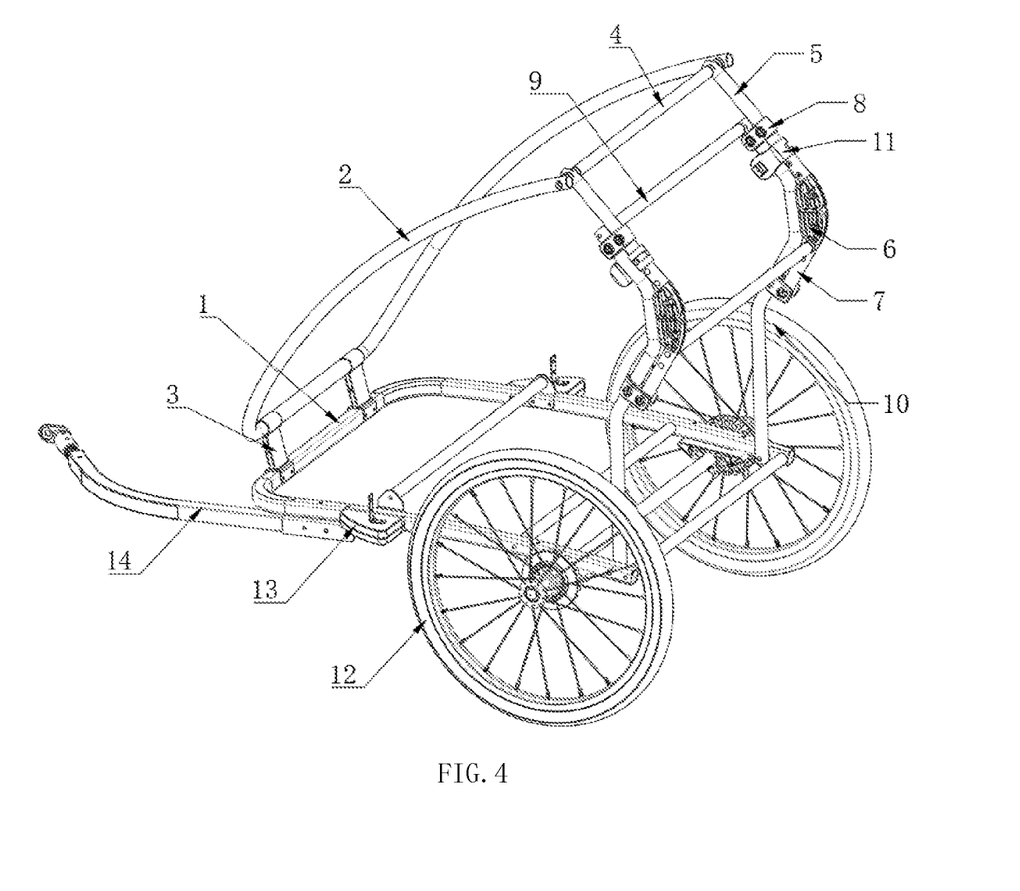
FIG. 4 is a schematic structural diagram of Embodiment 2 of a child trailer with low folding thickness proposed by the present invention.

Embodiment 2: Referring to FIG. 4, the difference from Embodiment 1 is that a folding locking member 11 matched with the tail rack 9 is fixed on the upper-section tail support rod 5, and after the trailer is unfolded, the folding locking members 11 are buckled on the tail rack 9.

Figure 5:
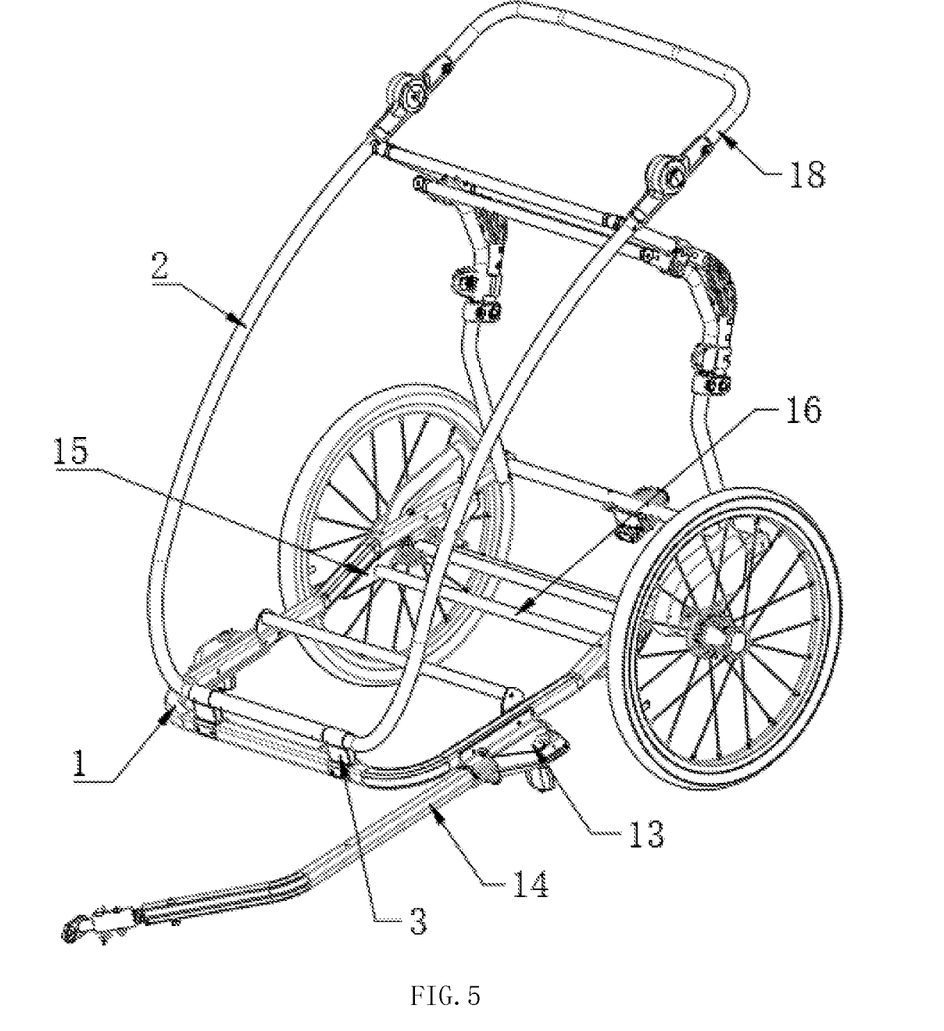
FIG. 5 is a schematic structural diagram of Embodiment 3 of a child trailer with low folding thickness proposed by the present invention.
Figure 6:
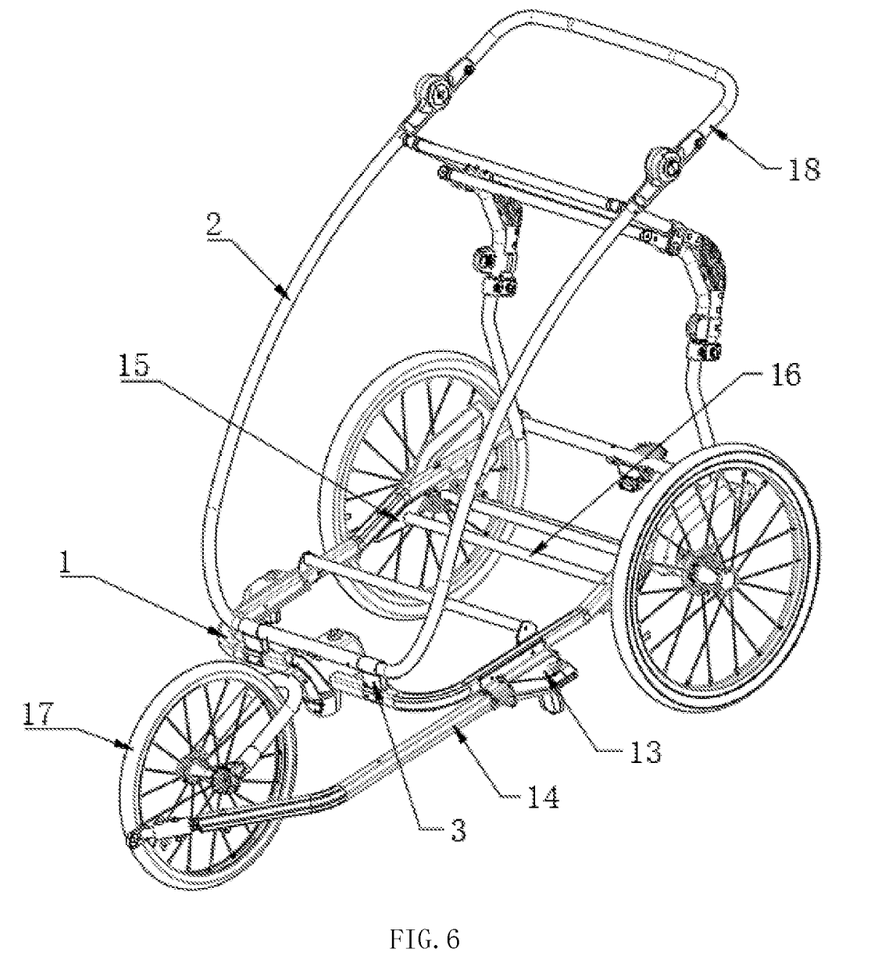
FIG. 6 is a schematic structural diagram of Embodiment 4 of a child trailer with low folding thickness proposed by the present invention.

Embodiment 3: Referring to FIG. 5, on the basis of Embodiment 1, a bending section located on the front side of the rear wheel 12 is disposed on each of the left and right sides of the bottom frame 1. An included angle between the bending section and a front section is between 160° and 170°. An included angle between the bending section and a rear section is between 160° and 170°. The rear section is higher than the front section. A rear seat member 15 is fixedly disposed on the lower side of each of the bending sections. A rear seat cross rod 16 is fixedly disposed between the two rear seat members 15. The seat cloth is fixed on the rear seat cross rod 16, so that the seat can be lowered to increase the bottom space of the seat, and the center of gravity can also be lowered to prevent the trailer from turning over.

Embodiment 4: Referring to FIG. 6 to FIG. 9, on the basis of Embodiment 1 or Embodiment 2, a front wheel component 17 is mounted at the front part of the bottom frame 1. The front wheel component 17 includes a front bicycle assembly seat 171 and a jogging wheel 173. The front bicycle assembly seat 171 includes a seat body 1711 fixed on the bottom frame of the trailer; the seat body 1711 is provided with an inserted rod sleeve 1712 with an opening toward the front side. The seat body 1711 is provided with a support plate 1713 configured to support the inserted rod sleeve 1712 to improve the strength of the front bicycle assembly seat 171. The upper side of the rear end of the inserted rod sleeve 1712 is provided with a fastener hole 1714 with threads on the inner wall, and the lower side of the seat body 1711 is provided with a cartwheel seat 1715.

Figure 7:
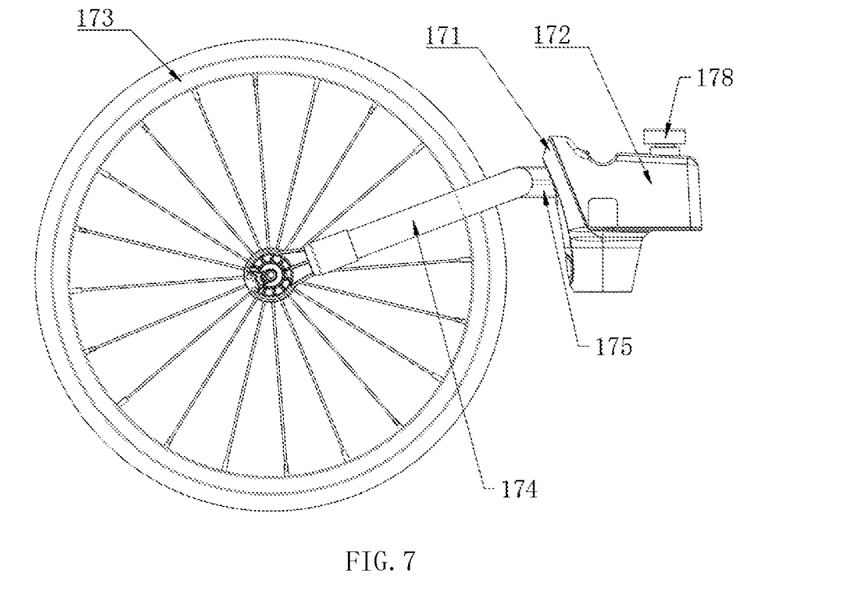
FIG. 7 is a schematic structural diagram of a front wheel component of a child trailer with low folding thickness proposed by the present invention in a state of assembling a jogging wheel.
Figure 8:
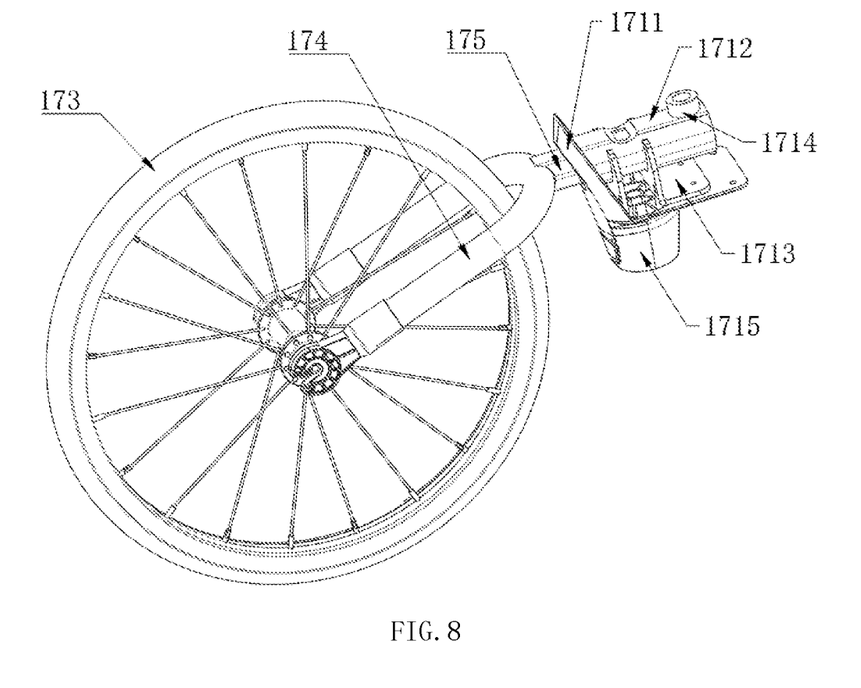
FIG. 8 is a schematic structural diagram of a front wheel component of a child trailer with low folding thickness proposed by the present invention after a housing is removed.

An axle of the jogging wheel 173 is rotationally connected with a jogging wheel front fork 174, and the rear end of the jogging wheel front fork 174 is fixedly provided with a jogging wheel inserted rod 175 matched with the inserted rod sleeve 1712.

Figure 9:
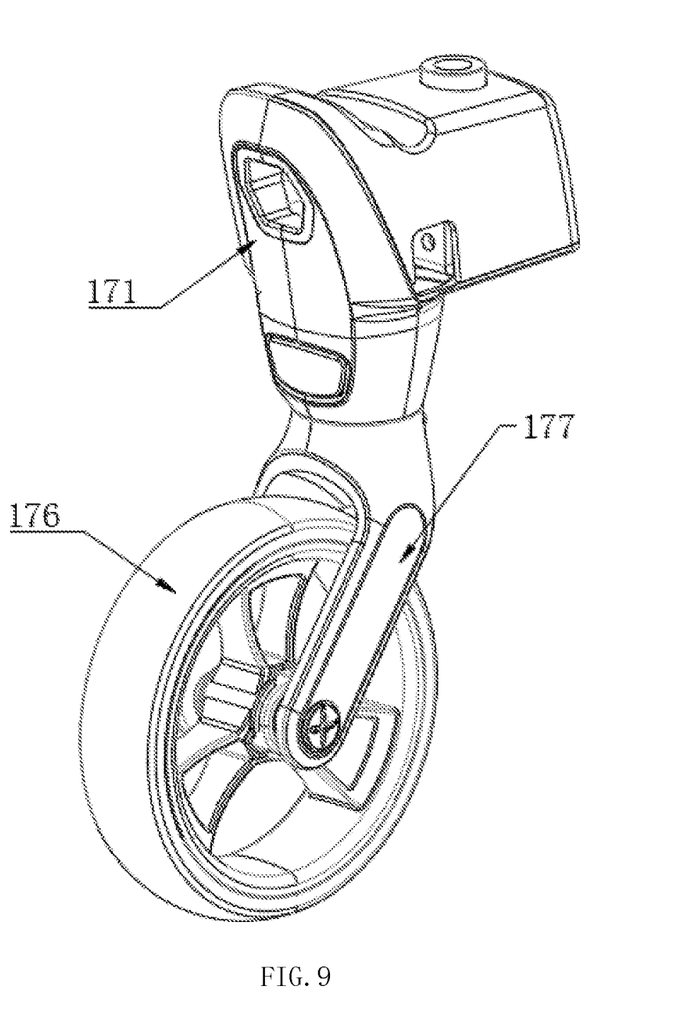
FIG. 9 is a schematic structural diagram of a front wheel component of a child trailer with low folding thickness proposed by the present invention in a state of assembling a cartwheel.

The front wheel component 17 also includes a jogging wheel fastener 178 matched with the fastener hole 1714 and a cartwheel 176, and the jogging wheel fastener 178 is preferably an elastic locking bolt. An axle of the cartwheel 176 is rotationally connected with a cartwheel front fork 177, and the upper end of the cartwheel front fork 177 is provided with a cartwheel connector matched with the cartwheel seat 1715.

Further, the upper side of the seat body 1711 is provided with an assembly seat upper housing 172 which is buckled with the seat body and has waterproof and dustproof functions.

When jogging is required, the jogging wheel 173 is assembled on the front side of the bottom frame of the trailer. During assembling, the jogging wheel inserted rod 175 is inserted into the inserted rod sleeve 1712; the jogging wheel fastener 178 matched with the fastener hole 1714 is screwed into the fastener hole 1714; the jogging wheel inserted rod 175 is locked and tightly pressed to make the jogging wheel inserted rod 175 have no displacement space, so that the jogging wheel 173 is mounted on the front side of the front bicycle assembly seat 171, which can reduce the offset in left and right directions in the traveling process of the trailer.

The jogging wheel 173 is mounted in the center and is parallel to the two rear wheels 12, and the jogging wheel front fork 174 is locked by the jogging wheel fastener 178, so that the phenomenon of deviation of the trailer toward the lateral side during jogging can be reduced.

When the trailer needs to be separated from a bicycle to be pushed, the jogging wheel 173 is dismounted; the cartwheel connector on the cartwheel front fork 177 is connected to the lower side of the cartwheel seat 1715 and is locked by a locking member, and then, the cartwheel 176 is mounted on the lower side of the front bicycle assembly seat 171.

The above are only the preferred specific embodiments of the present invention, but the protection scope of the present invention is not limited thereto. Any equivalent replacements or changes made by those skilled in the art within the technical scope disclosed by the present invention according to the technical solutions and concepts of the present invention shall fall within the protection scope of the present invention.

What is claimed is:

1. A child trailer with a low folding thickness, comprising a bottom frame and a side frame, wherein a front end of the bottom frame is rotationally connected with a front end of the side frame;
    a top support rod is fixed at a rear end of the side frame; a left end and a right end of the top support rod are respectively connected with an upper-section tail support rod rotating around an axis of the top support rod; a tail end of the upper-section tail support rod is connected with a first end of a folding joint; a second end of the folding joint is connected with a lower-section tail support rod; a rear end of the bottom frame is connected with a tail rack rotating around a shaft parallel to the axis of the top support rod; and a tail end of the lower-section tail support rod is rotationally connected with a middle part of the tail rack;
    a folding locking member matched with the tail rack is fixed on the lower-section tail support rod or the upper-section tail support rod; and
    rear wheels are mounted on a rear side of the bottom frame, and a towing rod device extending forward is fixed at a bottom of a front side of the bottom frame,
    wherein the folding joint comprises a first rotating block, a second rotating block and a rotating piece; the first rotating block is fixedly connected with an upper connecting part; the upper connecting part is fixed to the upper-section tail support rod; the second rotating block is fixedly connected with a lower connecting part; the lower connecting part is fixed to the lower-section tail support rod; the rotating piece is located on a rear side of the first rotating block and a rear side of the second rotating block; two ends of the rotating piece are respectively hinged at a middle part of the first rotating block and a middle part of the second rotating block; and rotating piece grooves matched with the rotating piece are respectively formed on the rear side of the first rotating block and the rear side of the second rotating block; and
    wherein an upper part of the tail rack is provided with two U-shaped bending parts; a middle part of each U-shaped bending part protrudes toward a rear side of the child trailer, an included angle of each U-shaped bending part is between 100° and 110°, and when the child trailer is unfolded, the tail rack is attached to the upper-section tail support rod, the folding joint and the lower-section tail support rod.

2. The child trailer with the low folding thickness according to claim 1, wherein the side frame is of a U-shaped structure; the front end of the bottom frame is fixedly connected with two side frame connecting racks; and the front end of the side frame is sleeved in the two side frame connecting racks and rotates around an axis of a section of the front end of the side frame, and the section of the front end of the side frame is connected with the two side frame connecting racks.

3. The child trailer with the low folding thickness according to claim 1, wherein anti-collision blocks are respectively disposed on a left side and a right side of the bottom frame.

4. The child trailer with the low folding thickness according to claim 1, wherein a push handle is disposed at the rear end of the side frame.

5. The child trailer with the low folding thickness according to claim 1, wherein a bending section located on a front side of the rear wheels is disposed on each of a left side and a right side of the bottom frame; an included angle between the bending section and a front section is between 160° and 170°; an included angle between the bending section and a rear section is between 160° and 170°, and the rear section is higher than the front section; a rear seat member is fixedly disposed on a lower side of each of the bending section, and a rear seat cross rod is fixedly disposed between the two rear seat members.

6. The child trailer with the low folding thickness according to claim 1, wherein a front wheel component is mounted at the front end of the bottom frame, and the front wheel component comprises a front bicycle assembly seat, a jogging wheel, a trailer wheel and a jogging wheel fastener.

7. The child trailer with the low folding thickness according to claim 6, wherein the jogging wheel is assembled on a front side of the front bicycle assembly seat and is locked by the jogging wheel fastener.

8. The child trailer with the low folding thickness according to claim 6, wherein the trailer wheel is assembled on a lower side of the front bicycle assembly seat and is locked by a locking member.

9. The child trailer with the low folding thickness according to claim 5, wherein a front wheel component is mounted at the front end of the bottom frame, and the front wheel component comprises a front bicycle assembly seat, a jogging wheel, a trailer wheel and a jogging wheel fastener.

* * * * *